United States Patent
Dittmar

(10) Patent No.: US 12,000,434 B2
(45) Date of Patent: Jun. 4, 2024

(54) SEAL ASSEMBLY FOR TRUCK HUBS WITH RADIAL LABYRINTH

(71) Applicant: AKTIEBOLAGET SKF, Gothenburg (SE)

(72) Inventor: Rico Dittmar, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/373,954

(22) Filed: Jul. 13, 2021

(65) Prior Publication Data

US 2023/0015151 A1    Jan. 19, 2023

(51) Int. Cl.
*F16C 33/80* (2006.01)
*F16C 33/78* (2006.01)
*F16J 15/447* (2006.01)

(52) U.S. Cl.
CPC .......... *F16C 33/80* (2013.01); *F16C 33/7883* (2013.01); *F16J 15/447* (2013.01); *F16C 2326/02* (2013.01)

(58) Field of Classification Search
CPC .... F16J 15/3264; F16J 15/447; F16C 33/782; F16C 33/7823; F16C 33/7879; F16C 33/7883; F16C 33/80; F16C 33/805; F16C 2326/02

See application file for complete search history.

(56) References Cited

U.S. PATENT DOCUMENTS

| | | | |
|---|---|---|---|
| 3,814,446 A * | 6/1974 | Derman | F16J 15/3456 277/366 |
| 4,434,985 A | 3/1984 | Sonnerat | |
| 5,431,413 A | 7/1995 | Hajzler | |
| 6,170,992 B1 | 1/2001 | Angelo et al. | |
| 6,550,973 B2 | 4/2003 | Yeo | |
| 7,021,830 B2 * | 4/2006 | Takehara | B60B 37/00 384/486 |
| 7,674,044 B2 * | 3/2010 | Matsui | F16J 15/3456 384/480 |
| 8,016,294 B2 | 9/2011 | Shibayama et al. | |

(Continued)

FOREIGN PATENT DOCUMENTS

JP    2009197884 A    9/2009
JP    2010091036 A    4/2010

(Continued)

*Primary Examiner* — Nicholas L Foster
(74) *Attorney, Agent, or Firm* — J-TEK LAW PLLC; Scott T. Wakeman; Mark A. Ussai

(57) ABSTRACT

A seal assembly for a truck wheel hub assembly includes an inner annular case having an axial portion disposable about an axle and a radial portion extending radially outwardly from the axial portion. An outer annular case is coupleable with a hub bore and has a radial portion extending radially inwardly from the bore. An annular elastomeric seal member has a base portion disposed on the outer case and at least one flexible axial seal lip with a first end integrally formed with the base portion and a second, free end sealingly engageable with the radial portion of the inner case. A radial projection extends radially inwardly from the outer case radial portion and has an inner radial end located adjacent to and spaced radially outwardly from the inner case axial portion or an outer circumferential surface disposed about the axle so as to form a labyrinth seal gap.

12 Claims, 7 Drawing Sheets

(56) References Cited

U.S. PATENT DOCUMENTS

| | | | |
|---|---|---|---|
| 8,267,591 B2* | 9/2012 | Baba | F16C 33/7823 384/486 |
| 8,356,942 B2* | 1/2013 | Torii | F16C 33/782 384/486 |
| 8,366,324 B2 | 2/2013 | Takimoto et al. | |
| 8,734,022 B2 | 5/2014 | Dittmar et al. | |
| 8,905,645 B2* | 12/2014 | Komori | F16C 19/186 384/504 |
| 8,979,385 B2* | 3/2015 | Haepp | F16C 33/7886 384/488 |
| 9,139,041 B2* | 9/2015 | Duch | F16C 41/007 |
| 9,261,144 B2* | 2/2016 | Duch | F16C 33/782 |
| 9,403,405 B2* | 8/2016 | Barberis | F16C 33/783 |
| 9,534,636 B2* | 1/2017 | Takayama | F16J 15/3264 |
| 9,956,820 B2* | 5/2018 | Gulli | F16C 33/782 |
| 10,119,571 B2* | 11/2018 | Seno | F16C 33/80 |
| 10,233,973 B2* | 3/2019 | Wollert | F16C 33/805 |
| 10,240,674 B2* | 3/2019 | Sakai | F16J 15/3264 |
| 10,385,922 B2 | 8/2019 | Inoue et al. | |
| 10,605,369 B2* | 3/2020 | Kato | F16C 41/007 |
| 10,677,291 B2* | 6/2020 | Senda | F16C 33/7883 |
| 10,900,524 B2* | 1/2021 | Seki | F16J 15/447 |
| 11,067,130 B2* | 7/2021 | Kim | F16J 15/4478 |
| 11,085,493 B2* | 8/2021 | Yu | F16J 15/3256 |
| 11,420,467 B2* | 8/2022 | Barberis | F16C 33/768 |
| 2002/0130655 A1* | 9/2002 | Okada | F16C 33/7896 324/174 |
| 2005/0089254 A1* | 4/2005 | Takehara | B60B 27/00 384/484 |
| 2006/0076737 A1 | 4/2006 | Kobayashi | |
| 2007/0024273 A1 | 2/2007 | Kobayashi | |
| 2007/0081751 A1* | 4/2007 | Norimatsu | F16C 33/7883 384/486 |
| 2008/0292231 A1* | 11/2008 | Matsui | F16J 15/3456 384/486 |
| 2009/0102134 A1 | 4/2009 | Shibayama et al. | |
| 2009/0127796 A1* | 5/2009 | Kanzaki | F16J 15/4478 277/562 |
| 2009/0206553 A1* | 8/2009 | Kanzaki | F16J 15/3268 277/351 |
| 2009/0322032 A1* | 12/2009 | Kanzaki | F16C 33/7879 277/351 |
| 2010/0232734 A1* | 9/2010 | Torii | F16C 19/184 384/481 |
| 2010/0247014 A1* | 9/2010 | Ohmori | F16C 33/7896 384/486 |
| 2011/0044569 A1 | 2/2011 | Haepp et al. | |
| 2011/0262063 A1 | 10/2011 | Dittmar et al. | |
| 2011/0262069 A1* | 10/2011 | Baba | B60B 27/0073 277/565 |
| 2013/0127119 A1* | 5/2013 | Haepp | F16C 33/805 277/572 |
| 2014/0003753 A1* | 1/2014 | Haepp | F16C 33/7886 384/480 |
| 2014/0376848 A1* | 12/2014 | Duch | F16C 33/768 384/448 |
| 2015/0063734 A1* | 3/2015 | Duch | F16C 33/805 384/480 |
| 2015/0117805 A1* | 4/2015 | Takayama | F16C 33/7883 384/480 |
| 2016/0003302 A1* | 1/2016 | Seno | F16J 15/3232 277/351 |
| 2016/0031261 A1 | 2/2016 | Ciulla et al. | |
| 2016/0091023 A1* | 3/2016 | Shiono | F16C 33/7883 384/480 |
| 2016/0221391 A1* | 8/2016 | Lim | F16J 15/3264 |
| 2016/0236509 A1* | 8/2016 | Gulli | B60B 27/0073 |
| 2018/0135700 A1* | 5/2018 | Senda | F16J 15/3232 |
| 2018/0156336 A1 | 6/2018 | Kato | |
| 2020/0079150 A1* | 3/2020 | Barberis | B60B 27/0073 |
| 2020/0141448 A1* | 5/2020 | Kim | F16J 15/3264 |
| 2020/0166081 A1* | 5/2020 | Dittmar | F16C 33/7889 |
| 2020/0292000 A1* | 9/2020 | Yu | F16C 33/7823 |
| 2021/0041025 A1 | 2/2021 | Duch | |
| 2021/0129582 A1* | 5/2021 | Regan | F16C 43/045 |
| 2021/0254668 A1* | 8/2021 | Suzuki | F16C 33/7883 |
| 2021/0355995 A1* | 11/2021 | Sugawara | F16J 15/3256 |
| 2021/0387474 A1* | 12/2021 | Bertola | B60B 27/0094 |
| 2022/0213931 A1* | 7/2022 | Seki | F16J 15/3232 |
| 2023/0015151 A1* | 1/2023 | Dittmar | F16C 33/7886 |

FOREIGN PATENT DOCUMENTS

| | | |
|---|---|---|
| JP | 2013217419 A | 10/2013 |
| JP | 2017013706 A | 1/2017 |
| JP | 2017015125 A | 1/2017 |

* cited by examiner

SEAL ASSEMBLY FOR TRUCK HUBS WITH RADIAL LABYRINTH

BACKGROUND OF THE INVENTION

The present invention relates to seals, and more particularly to seals for wheel hub assemblies.

Wheel hub assemblies, particularly for mounting wheels to vehicles such as trucks, typically include an inner axle connected with a vehicle frame, an outer hub connectable to the wheel, and a bearing for rotatably coupling the hub with the axle. The bearings are often double-row tapered rollers disposed between the outer hub and the inner axle and enable the hub, and thereby the wheel, to rotate about a central axis extending through the fixed axle. As such bearings are generally exposed to contaminants such as brake dust, dirt, oil, metal shavings, etc., which may damage the bearings if contacting the rolling elements or the bearing raceway surfaces, one or more seals are provided adjacent to the raceways to exclude such contaminants. Such seal assemblies primarily function to retain lubricant, for example, oil, grease, etc., within the bearing. Further, when such wheel hub assemblies are used on an electric vehicle, it is particularly important to minimize friction within the hub assembly to reduce electric power consumption and prevent premature drainage of the vehicle batteries.

SUMMARY OF THE INVENTION

In one aspect, the present invention is a seal assembly for retaining lubricant within a truck wheel hub assembly, the hub assembly including an inner axle with a central axis, an outer hub disposed about the axle and having a bore, the axle extending through the bore and a bearing rotatably coupling the hub with the axle such that the hub rotates about the axis. The seal assembly comprises an inner annular case having an axial portion disposable about the axle and a radial portion extending radially outwardly from the axial portion. An outer annular case is coupleable with the hub bore and has a radial portion extending radially inwardly from the bore so as to be disposed axially between the bearing and the radial portion of the inner case. An annular elastomeric seal member has a base portion disposed on the outer case, at least one flexible axial seal lip with a first end integrally formed with the base portion and a second, free end sealingly engageable with the radial portion of the inner case so as to retain lubricant within the bearing, and a radial projection extending radially inwardly from the outer case radial portion. The radial projection has an inner radial end located adjacent to and spaced radially outwardly from the inner case axial portion or an outer circumferential surface disposed about the axle so as to form a labyrinth seal gap configured to restrict lubricant flow from the bearing.

In another aspect, the present invention is a wheel hub assembly comprising an inner axle with a central axis, an outer hub disposed about the axle and having a bore, the axle extending through the bore, a bearing rotatably coupling the hub with the axle such that the hub rotates about the axis, and a seal assembly as described in the preceding paragraph.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
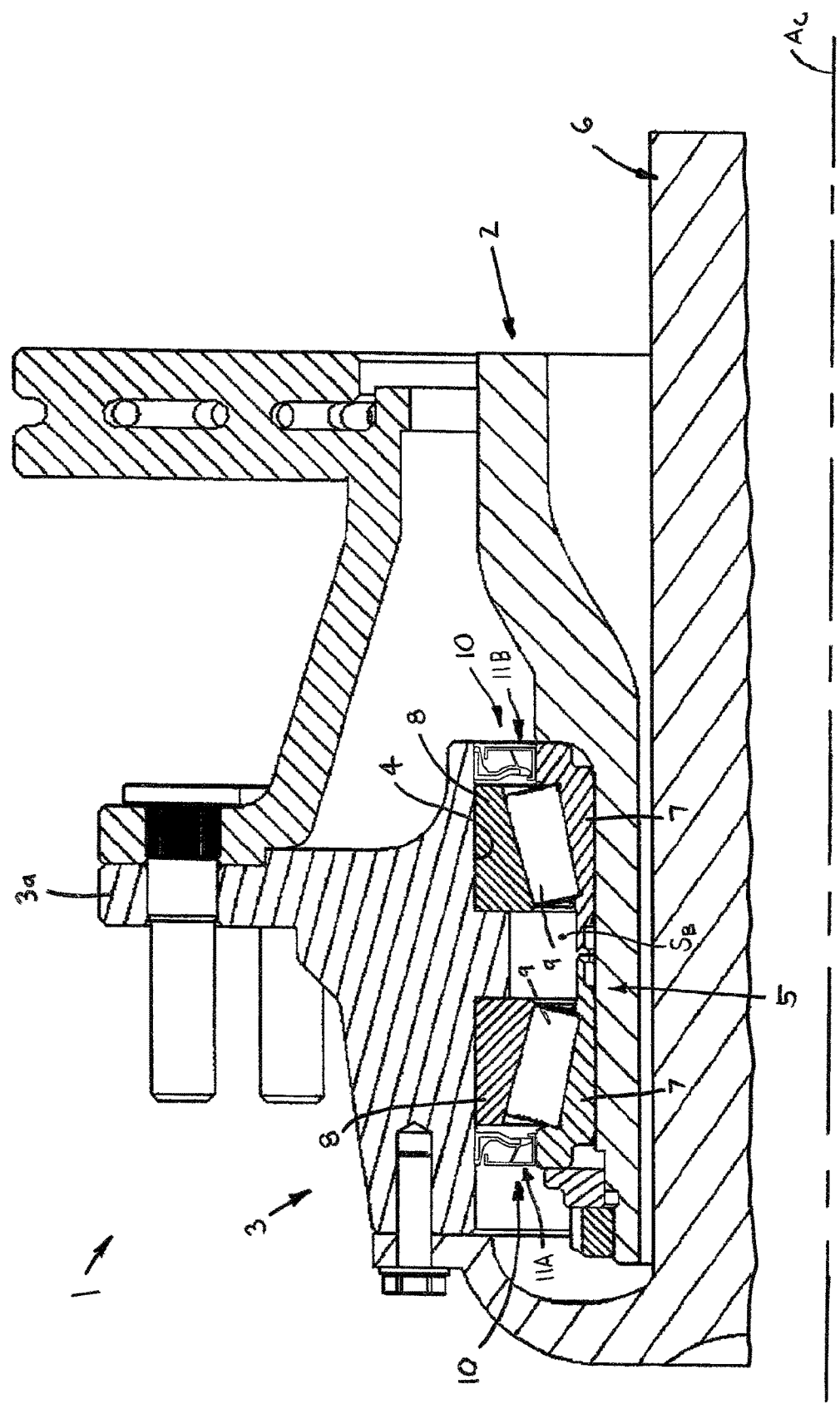
FIG. 1 is an axial cross-sectional view of a truck hub assembly including two seal assemblies in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-7 a seal assembly 10 for a truck wheel hub assembly 1, preferably for an electrically powered or "electric" truck. The hub assembly 1 includes an inner axle 2 with a central axis $A_C$, an outer hub 3 disposed about the axle 2 and having a bore 4, the axle 2 extending through the bore 4, and a bearing 5 rotatably coupling the hub 3 with the axle 2 such that the hub 3 rotates about the axis $A_C$. The axle 2 is fixedly connected with a vehicle frame (not shown) and the hub 3 is connected with a drive shaft 6, has a flange portion 3a connected with a wheel (not shown) and is connected with a steering mechanism and/or a suspension assembly (neither shown). The bearing 5 includes at least one inner ring 7 disposed on the axle 2, at least one outer ring 8 coupled with the hub 3, and a plurality of rolling elements 9, preferably cylindrical or tapered rollers.

The seal assembly 10 basically comprises an inner annular case 12 disposable about the axle 2, and preferably connected through the bearing inner ring 8, an outer annular case 14 coupleable with the hub bore 4 and an annular elastomeric seal member 16 disposed on the outer case 14. The seal assembly 10 is configured to retain lubricant, such as oil, grease, etc., within the bearing 5, specifically within a space $S_B$ between and adjacent to the inner and outer rings 7, 8, and prevents contaminants or "substances" (e.g., brake dust, mud, etc.) from entering the bearing 5. Preferably, the seal assembly 10 is provided within the wheel hub assembly 1 as a pair of seal assemblies 10, specifically a first seal assembly 11A and a second seal assembly 11B, each seal assembly 11A, 11B being disposed on a separate, opposing axial side of the bearing 5 and defining the boundaries of the bearing space $S_B$. However, the seal assembly 10 may be provided as a single seal assembly if the hub assembly 1 is configured such that one end of the bearing 5 is enclosed by other structure (e.g., a shoulder of the axle 2).

More specifically, the inner case 12 has an axial portion 20 mountable on the axle 2 having first and second axial ends 20a, 20b, a primary radial portion 22 extending radially outwardly from the axial portion first end 20a, a secondary radial portion 24 extending radially outwardly from the second axial end 20b and an outer axial portion 26 extending from the radial portion 24. The axial portion 20 has an inner circumferential surface 21A defining a central bore 21 configured to receive the axle 2 (e.g., through the bearing inner ring 7) and an outer circumferential surface 21B. The primary radial portion 22 has an inner radial end 22a integrally connected with the second axial end axial portion 20, an outer radial end 22b, and opposing radial surfaces 23A, 23B, the inner radial surface 23A providing an axial lip contact surface 27 as discussed in further detail below. Further, the outer axial portion 26 extends axially from the radial portion outer end 22b and generally toward the outer case 14, as discussed in further detail below.

Figure 2:
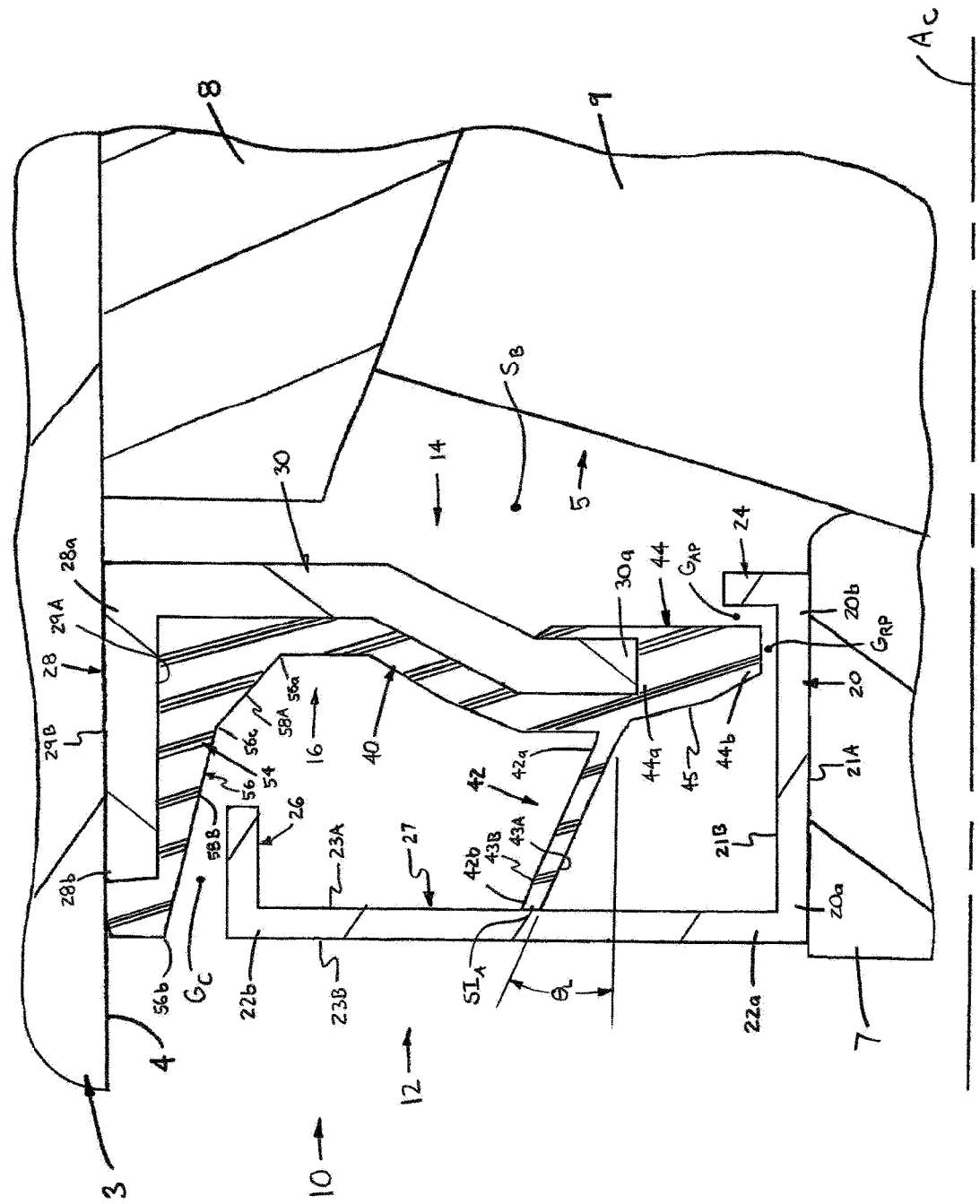
FIG. 2 is a broken-away, enlarged view of a portion of FIG. 1, showing a seal member having a single axial seal lip and a radial seal lip.

Furthermore, the outer case 14 has an axial portion 28 engageable with the hub bore 4 and a radial portion 30 extending radially inwardly from axial portion 28 and from the bore 4. The outer case axial portion 28 has an inner circumferential surface 29A and an opposing outer circumferential surface 29B, which is frictionally engageable with the bore 4 to couple the outer case 14 and the seal member 16 with the hub 3, and opposing first and second axial ends 28a, 29b. Also, the outer case radial portion 30 extends radially inwardly from the first end of 28a of the axial portion 28. As best shown in FIG. 2, the two cases 12, 14 are relatively arranged such that the outer case radial portion 30 is disposed or disposable between the bearing 5 and the radial portion 22 of the inner case 12, for reasons discussed below. Also, the outer axial portion 26 of the inner case 12 extends axially generally toward the outer case radial portion 30 and is spaced radially inwardly from the outer case axial portion 28 so as to define a generally radial labyrinth seal gap $G_C$.

Figure 5:
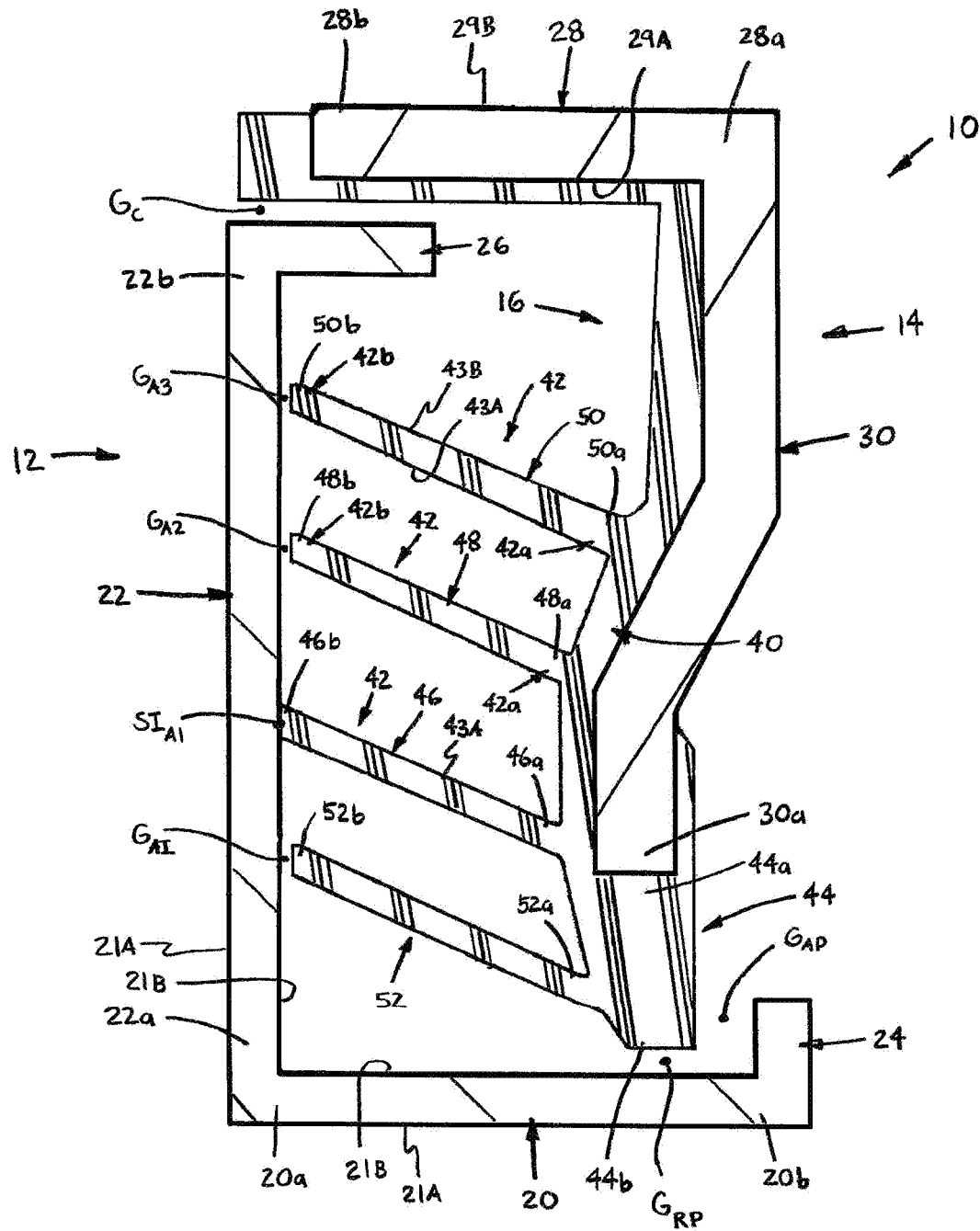
FIG. 5 is an axial cross-sectional view of a seal assembly showing a seal member having four axial seal lips, with a first axial lip sized to sealingly engage the inner case and with an inner axial lip and the second and third axial lips each forming a labyrinth seal gap.
Figure 6:
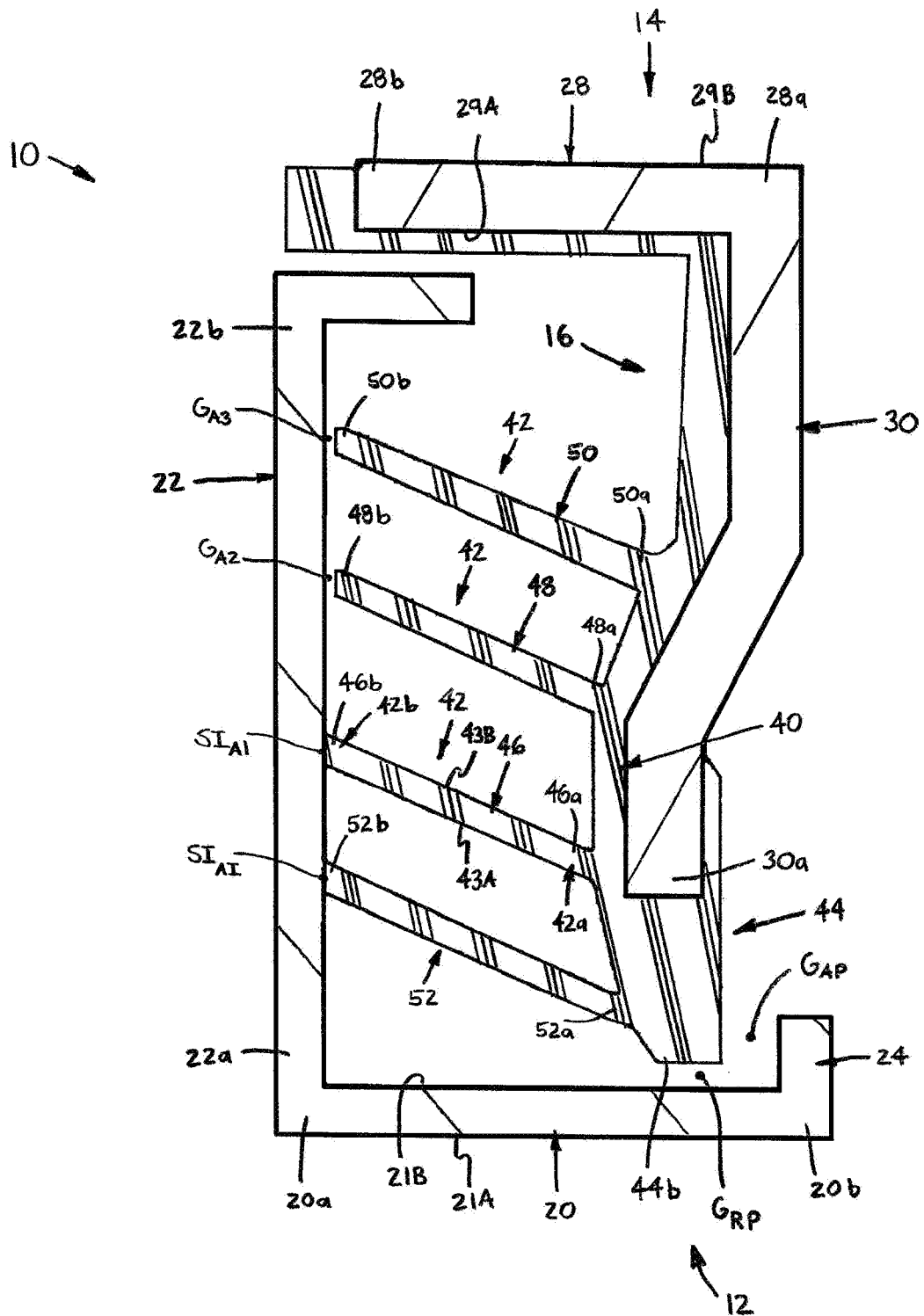
FIG. 6 is another axial cross-sectional view of a seal assembly showing a seal member having four axial seal lips, with the first and inner axial lips sized to sealingly engage the inner case and the second and third axial lips each forming a labyrinth seal gap.
Figure 7:
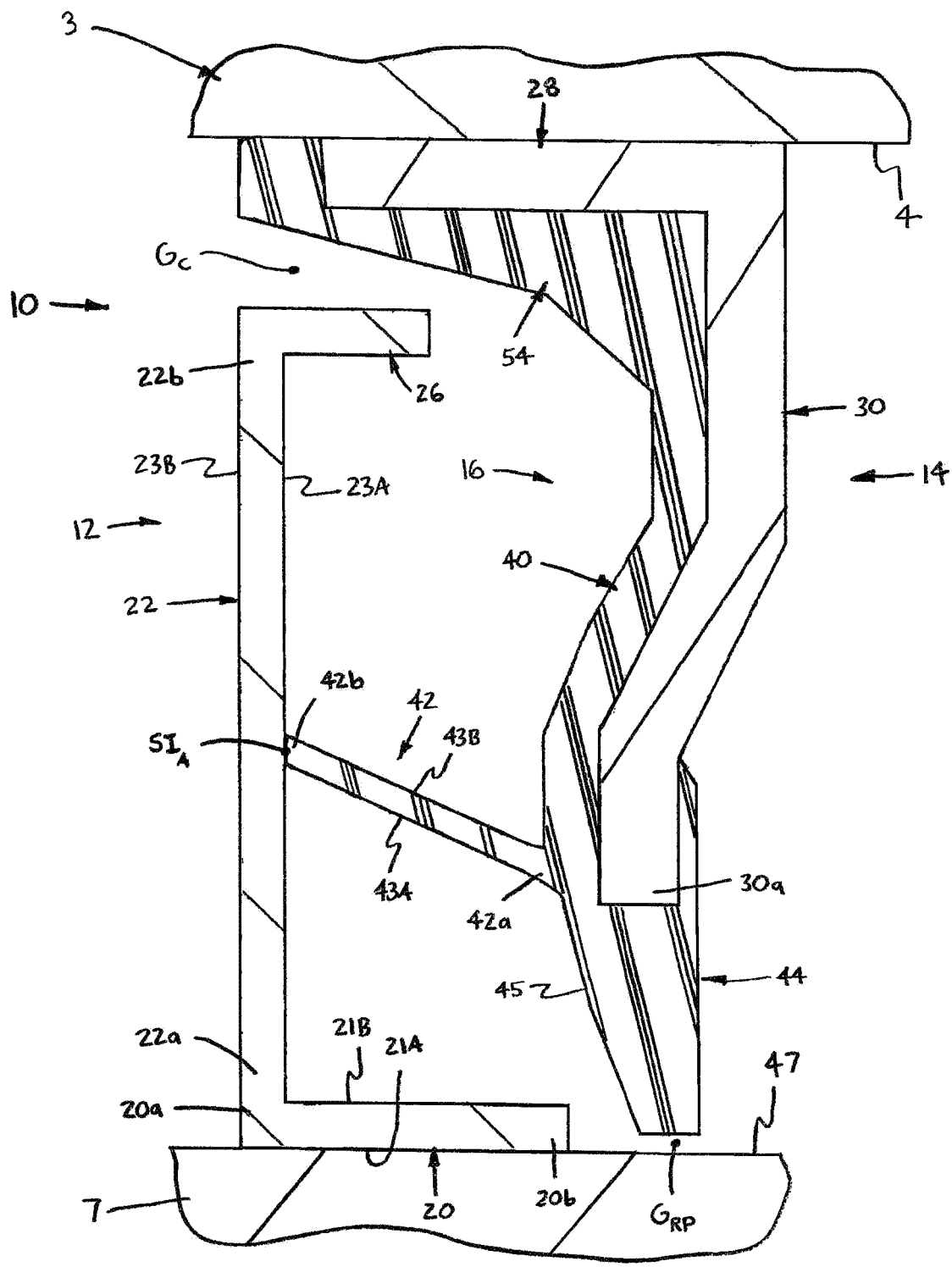
FIG. 7 is an axial cross-sectional view of a seal assembly with an alternative inner case structure and with a radial projection forming a labyrinth seal with an outer circumferential seal about an inner axle.

Referring now to FIGS. 2-7, the annular elastomeric seal member 16 has a base portion 40 disposed on the radial portion 30 of the outer case 14, at least one flexible axial seal lip 42, and a radial projection 44 extending radially inwardly from the outer case radial portion 30. The radial projection 44 is generally annular and has an outer radial end 44a integral with the base portion 40 and disposed on the inner radial end 30a of the outer case radial portion 30 and inner radial end 44b. The projection inner radial end 44b is located adjacent to and spaced radially outwardly from the inner case axial portion 20, or an outer circumferential surface 47 disposed about the axle 2 (e.g., on the bearing inner ring 7 as shown in FIG. 7), so as to form a radial labyrinth seal gap $G_{RP}$. The labyrinth gap $G_{RP}$ is configured to restrict lubricant flow from the bearing 5, particularly as lubricant tends to be directed radially outwardly during rotation of the hub 3, and thus away from the gap $G_{RP}$ at the inner radial end of the seal assembly 10. Also, the radial projection 44 is disposed axially between the inner case primary radial portion 22 and the inner case secondary radial portion 24, and is preferably located at least generally adjacent to the secondary radial portion 24 so as to define an axial labyrinth seal gap $G_{AP}$, which also functions to restrict lubricant flow from the bearing 5.

Figure 3:
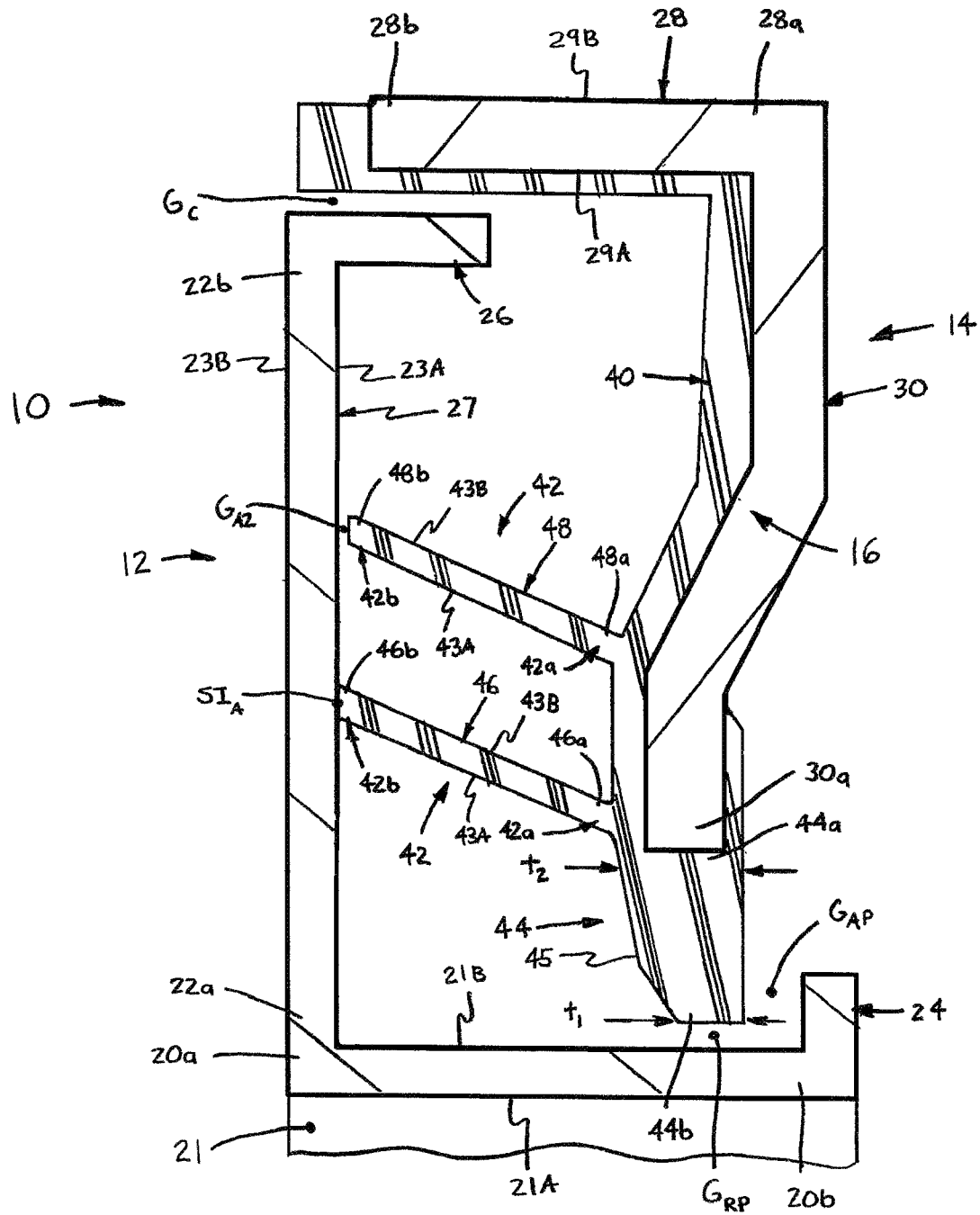
FIG. 3 is an axial cross-sectional view of a seal assembly showing a seal member having first and second axial seal lips and a radial seal lip, with a first axial lip sized to sealingly engage an inner case and a second axial lip forming a labyrinth seal gap.

Preferably, the annular radial projection 44 of the seal member 16 has an angled contact surface 45 extending radially outwardly from the inner end 44b and axially toward the inner case primary radial portion 22. With this structure, substances contacting the angled surface 45 are directed generally radially outwardly away from the labyrinth seal gap $G_{RP}$, such that the projection 44 functions generally as a flinger during rotation of the hub 3. More specifically, the radial projection 44 is preferably formed having a first axial thickness $t_1$ at the inner radial end and a second, greater axial thickness $t_2$ at the outer radial end 44a, as indicated in FIG. 3. As such, the projection 44 has generally wedge-shaped axial cross-sections, this wedge structure providing the angled contact surface 45.

Still referring to FIGS. 2-7, the at least one axial seal lip 42 has a first, inner end 42a integrally formed with the base portion 40 and a second, free outer end 42b sealingly engageable with the primary radial portion 22 of the inner case 12 so as to be configured to retain lubricant within the bearing space $S_B$. Each lip 42 extends generally axially and radially outwardly from the first end 42a to the second end 42b such that the lip 42 is biased radially outwardly by centrifugal force during rotation of the hub 3. That is, due to the radially outwardly sloped structure of the axial lip 42 as described in further detail below, centrifugal forces generated within the rotating seal member 16 cause the lip 42 to bend radially outwardly about the lip first end 42a. Such bending or deflection of the at least one lip 42 reduces sealing pressure of the lip second end 42b on the inner case radial portion 22.

More particularly, the at least one axial lip 42 is formed to both reduce sealing pressure as discussed above and to function as a "flinger" to direct substances (e.g., liquids such as water or oil, solid particles such as brake dust, dirt, etc.) away from the one or more sealing interfaces SI formed by the lips of the seal member 16. Specifically, each of the one or more axial seal lips 42 is generally frustoconical and defines an acute angle $\theta_L$ (FIG. 2) with respect to the central axis $A_C$, such that the lip 42 is sloped upwardly in a direction axially away from the base portion 40 of the seal member 16. Preferably, the angle $\theta_L$ has a value of at least thirty degrees (30°), but may be more or less steeply sloped depending on the particular application.

Further, the seal lip 42 has an inner circumferential surface 43A and an opposing outer circumferential surface 43B, each one of the circumferential surfaces 43A, 43B being angled radially outwardly in a direction from the lip first end 42a to the lip second end 42b. As such, any substances contacting the inner circumferential surface 43A or the outer circumferential surface 43B are directed generally radially outwardly along the surfaces 43A, 43B during rotation of the hub 3, and therefore away from the seal interface(s) SI. Further, due to the outer case radial portion 30 being disposed between the bearing 5 and the inner case radial portion 22, the one or more axial lips 42 each extend from the seal member base portion 40 in a direction generally axially away from the bearing 5. Due to this orientation of the axial lip(s) 42, the "flinger" action of the lips 42 tends to direct substances away from the bearing 5.

Figure 4:
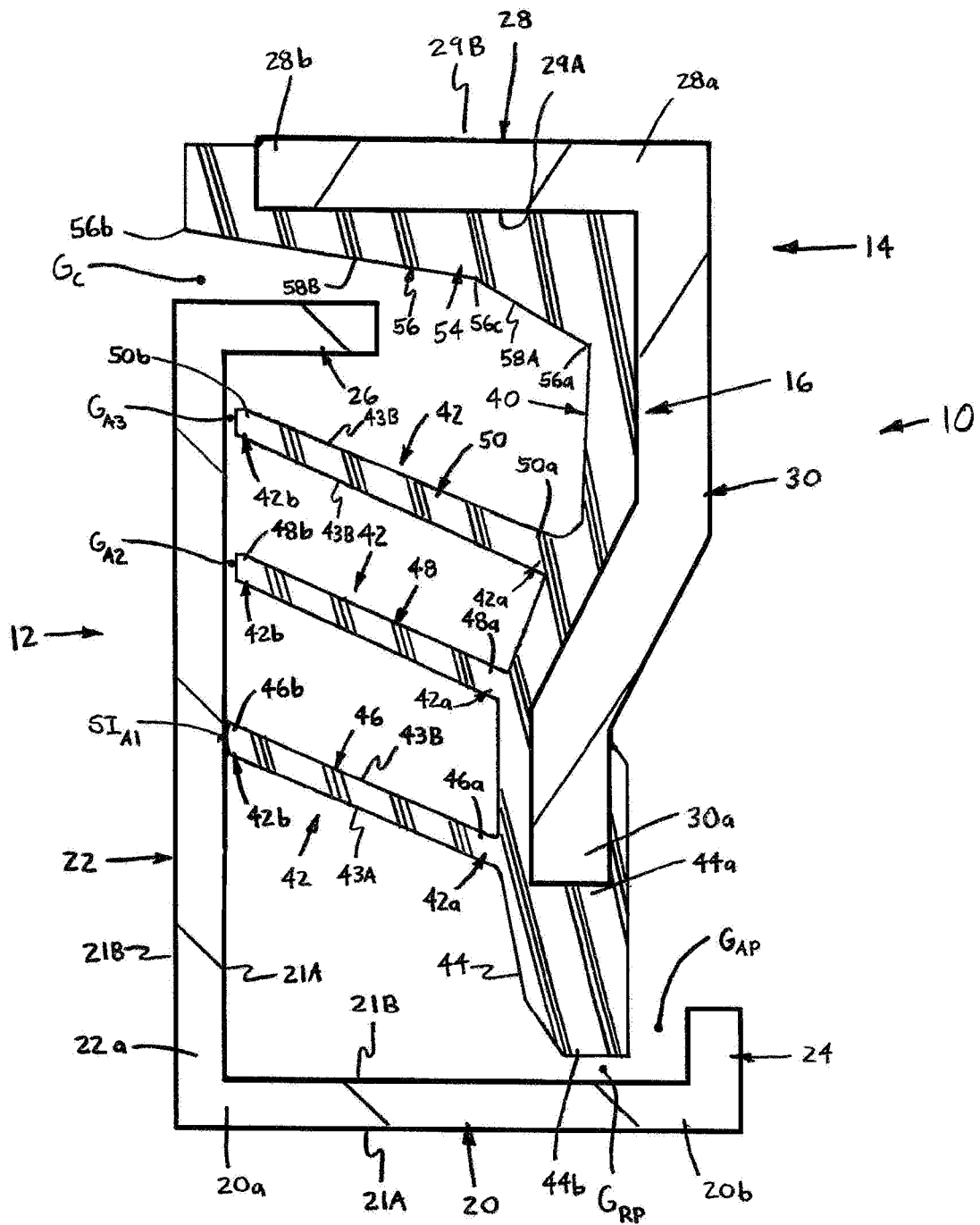
FIG. 4 is an axial cross-sectional view of a seal assembly showing a seal member having three axial seal lips and a radial seal lip, with the first axial lip sized to sealingly engage the inner case and with the second and a third axial lip each forming a labyrinth seal gap.

Referring to FIGS. 3-6, the seal assembly 10 may be formed having multiple axial seal lips 42, preferably either a double lip seal as shown in FIG. 4, a triple lip seal as depicted in FIG. 4, or a quadruple lip seal as shown in FIGS. 5 and 6, although five or more axial lips are also within the scope of the present invention (no other alternatives shown). In the double-lip embodiment of FIG. 3, the at least one axial seal lip 42 is a first axial seal lip 46 having first and second ends 46a, 44b and the seal member 16 further includes a second flexible axial seal lip 48 spaced radially outwardly from the first axial seal lip 46. The second axial lip 48 is similarly constructed as the first lip 46 and has a first end 48a integrally formed with the seal member base portion 40, specifically at a location radially outwardly from the first end 46a of the first seal lip 46, and a second, free end 48b engaged with or spaced apart from the inner case primary radial portion 22. The second axial seal lip 48 extends generally axially and radially outwardly from the seal lip first end 48a to the seal lip second end 48b. As such, the second axial seal lip 48 is biased radially outwardly by centrifugal force during rotation of the hub 12 in a manner similar to the first axial lip 46.

As shown in FIG. 3, the second axial lip 48 may be configured to form a labyrinth seal, specifically by sizing the "length" of the lip 48 such that the second end 48b is spaced axially from the inner case primary radial portion 22 so as to define an axial labyrinth seal gap $G_{A2}$. Thereby, instead of directly sealing on the inner case 12, the lip 48 functions as a barrier to prevent substances from migrating radially inwardly, except through the relatively small axial gap $G_{A2}$, and as a "flinger" to direct substances generally away from the sealing interface $SI_{A1}$ formed by the first axial lip 46. Alternatively, the second axial lip 48 may function as a conventional axial lip and be sized to sealingly engage with the radial portion 22 of the inner case 12, thereby creating a second axial seal lip interface located radially outwardly from the interface $SI_{A1}$ of the first axial lip 46 (structure not shown). Even in a seal assembly 10 with two axial sealing interfaces $SI_A$, friction generated by the seal assembly 10 is substantially reduced in comparison with a conventional seal assembly due to the reduced sealing pressure within each interface $SI_A$ owing to centrifugal action on each sloped conical axial lip 42.

As discussed above, the seal assembly 10 may be fabricated with a "triple" axial lip seal member 16 as shown in FIG. 4. Specifically, the seal member 16 may include a third axial seal lip 50 spaced radially outwardly from the second axial seal lip 48 and formed as the conical seal lip 42 as described above. As such, the third axial seal lip 50 has a first end 50a integrally formed with the seal member base portion 40, specifically at a location outwardly from the first end 48a of the second lip 48, and a second, free end 50b engaged with or spaced axially apart from the inner case radial portion 22. As described above, the third axial seal lip 50 also extends generally axially and radially outwardly from the seal lip first end 50a to the seal lip second end 50b, and is likewise biased radially outwardly by centrifugal force during rotation of the hub 3.

In certain constructions, the third axial lip 50 has a length between the first and second ends 50a, 50b which is sized to form a labyrinth seal gap $G_{A3}$ between the lip second end 50b and the primary radial portion 22 of the inner case 12. Such a third lip gap $G_{A3}$ may function alone as a labyrinth seal (not shown) or in combination with a second lip gap $G_{A2}$ as depicted in FIG. 4. Alternatively, the third axial lip 50 may be sized such that the second end 50b sealingly engages with the inner case radial portion 22 (structure not depicted), either in combination with both of the first and second lips 46, 48 or only with the first lip 46 and with the second axial lip 48 forming a labyrinth gap $G_{A2}$. In any case, the third axial lip 50 is substantially formed and substantially functions as described above with the basic structure of the axial seal lip 42.

Referring now to FIGS. 5 and 6, the seal member 16 may be formed having an inner axial seal lip 52 spaced inwardly from the at least one axial seal lip 42, which is preferably provided in a "quadruple lip" configuration as depicted, but may be provided on a seal member 16 without a third axial lip 50 or even without a second axial lip 48 (neither alternative shown). The inner axial lip 52 has a first end 52a integrally formed with the radial projection 44 and a second, free end 52b. The inner lip second end 52b is either sealingly engageable with the inner case radial portion 22 to form an inner axial seal interface $SI_{A1}$, as shown in FIG. 6, or spaced axially from the inner case radial portion so as to define a labyrinth seal gap $G_{A1}$, as depicted in FIG. 5.

The inner axial lip 52 is preferably formed substantially as described above with basic structure of the lip 42. Specifically, the inner axial seal lip 52 extends generally axially and radially outwardly from the first end 52a to the second end 52b and is generally frustoconical. As such, when the inner lip 52 is sized with a sufficient length to sealingly engage with the case radial portion 22 (as shown in FIG. 6), the inner lip 52 is biased radially outwardly by centrifugal force during rotation of the hub 3, thereby reduce sealing pressure against the inner case 12.

Referring now to FIGS. 2 and 4, the seal member base portion 40 may be formed to include a "flinger" wedge section 54 disposed on the inner surface 29A of the outer case axial portion 28 and having an angled contact surface 56. The angled surface 56 has a radially inner end 56a adjacent to the outer case radial portion 30 and a radially outer end 56b adjacent to the second axial end 28b of the outer case axial portion 28. Preferably, the contact surface 54 is formed of first and second axially spaced surface sections 58A, 58B, the first section 58A extending between the inner end 56a to a midpoint 56c and the second section 58B extending between the outer end 56b and the midpoint 56a. However, the contact surface 56 may alternatively extend at a constant angle between the ends 56a, 56b (structure not shown). With either structure, the substances contacting the angled surface 56 are directed radially outwardly and axially away from the outer case radial portion 26 and into the labyrinth gap $G_C$, and thus away from the bearing 5, during rotation of the hub 3.

The seal assembly 10 of the present invention, in any of the particular constructions or embodiments disclosed herein, is clearly advantageous over previously known seals for wheel hub assemblies. First, by having axial lips 32 that are formed to become biased radially outwardly during rotation of the hub 4, the sealing pressure is substantially reduced in comparison with standard axial lip designs, decreasing friction within the seal assembly 10. Also, with multiple axial lips 32, sizing one or more of the lips 32 to form a labyrinth seal gap, as opposed to being in direct sealing engagement, also reduces the amount of friction generated by the seal assembly 10. Further, by providing a radial projection 44 forming a radial labyrinth gap $G_{RP}$, as opposed to a radial lip sealing on the inner case or other outer circumferential surface, the seal assembly 10 generates substantially less friction than a conventional seal assembly used with wheel hubs.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A truck wheel hub assembly comprising:
    an inner axle with a central axis;
    an outer hub disposed about the axle and having a bore, the axle extending through the bore and a bearing rotatably coupling the hub with the axle such that the hub rotates about the axis; and
    a seal assembly including:
        an inner annular case having an axial portion disposable about the axle and a radial portion extending radially outwardly from the axial portion;
        an outer annular case having an axial portion configured to be coupled with the hub bore such that the outer case is configured to rotate about the central axis when the hub rotates about the axis, the outer case further having a radial portion extending radially inwardly from the axial portion and configured to be disposed axially between the bearing and the radial portion of the inner case when the axial portion is coupled with the hub, the radial portion having a first axial end facing in a first direction and a second axial end facing in a second, opposing direction; and
        an annular elastomeric seal member having:
            a base portion disposed on the radial portion of the outer case;
            a rigid radial projection extending radially inwardly from the outer case radial portion and having an innermost radial end configured to be located adjacent to and spaced radially outwardly from the inner case axial portion or an outer circumferential surface disposed about the axle so as to form a labyrinth seal gap configured to restrict lubricant flow from the bearing, an outer radial end, a first substantially flat radial side surface facing in the first direction and extending continuously radially between the outer radial end and the innermost radial end, at least a major portion of the first radial side surface being spaced axially in the first direction from the first axial end of the outer case radial portion, and a second substantially flat radial side surface facing in the second axial direction and extending continuously radially between the outer radial end and the innermost radial end, at least a major portion of the second radial side surface being spaced axially in the second direction from the second axial end of the outer case radial portion; and
            at least one flexible axial seal lip with a first end integrally formed with the base portion so as to be spaced radially outwardly from an innermost end of the radial portion of the outer case and a second, free end sealingly engageable with the radial portion of the inner case so as to retain lubricant within the bearing.

2. The wheel hub assembly as recited in claim 1, wherein the axial seal lip is a first axial seal lip and the seal member further includes a second flexible axial seal lip spaced radially outwardly from the first axial seal lip and having a first end integrally formed with the base portion and a second, free end sealingly engaged with or spaced apart from the inner case radial portion so as to define a labyrinth seal gap, the second axial seal lip extending generally axially and radially outwardly from the first end of the second flexible axial seal lip to the second end of the second flexible axial seal lip such that the second axial seal lip is configured to be biased radially outwardly by centrifugal force during rotation of the hub.

3. The wheel hub assembly as recited in 2, wherein the seal member further includes a third axial seal lip spaced radially outwardly from the second axial seal lip and having a first end integrally formed with the base portion and a second, free end engaged with or spaced apart from the inner case radial portion, the third axial seal lip extending generally axially and radially outwardly from the first end of the third axial seal lip to the second end of the third axial seal lip such that the third axial seal lip is configured to be biased radially outwardly by centrifugal force during rotation of the hub.

4. The wheel hub assembly as recited in claim 1, wherein the radial projection has an angled surface extending radially outwardly from the inner end and axially toward the inner case radial portion such that substances contacting the angled surface are directed generally radially outwardly away from the labyrinth seal gap.

5. The wheel hub assembly as recited in claim 4, wherein the radial projection has a first axial thickness at the inner radial end and a second axial thickness at the outer radial end, the second thickness being greater than the first axial thickness such that the projection has generally wedge-shaped axial cross-sections.

6. The wheel hub assembly as recited in claim 1, wherein the axial portion of the inner case has first and second axial ends, the radial portion extending outwardly from the first axial end and the inner case further includes a secondary radial portion extending radially outwardly from the second axial end of the axial portion, the radial projection of the seal member being disposed axially between the radial portion and the secondary radial portion and adjacent to the secondary radial portion so as to define an axial labyrinth seal gap.

7. The wheel hub assembly as recited in claim 1, wherein:
the axial portion of the outer case has first and second axial ends, the radial portion extending inwardly from the first axial end, and an inner circumferential surface; and
the seal member base portion includes a wedge section disposed on the inner surface of the outer case axial portion and having an angled contact surface with a radially inner end adjacent to the outer case radial portion and a radially outer end adjacent to the second axial end of the outer case axial portion such that substances contacting the angled surface are directed radially outwardly and axially away from the outer case radial portion during rotation of the hub.

8. The wheel hub assembly as recited in claim 1, wherein the at least one axial seal lip extends from the seal member base portion in a direction generally axially away from the bearing when the outer annular case is coupled with the hub bore and the radial projection is disposed axially between the bearing and the radial portion of the inner case.

9. The wheel hub assembly as recited in claim 1, wherein the at least one axial seal lip is generally frustoconical and defines an acute angle with respect to the central axis, the angle having a value of at least thirty degrees.

10. The wheel hub assembly as recited in claim 9, wherein the at least one axial seal lip has an inner circumferential surface and an opposing outer circumferential surface, each one of the inner circumferential surface and the outer circumferential surface being angled radially outwardly in a direction from the first end to the second end such that substances contacting the inner circumferential surface or the outer circumferential surface are directed generally radially outwardly during rotation of the hub.

11. The wheel hub assembly as recited in claim 1, wherein the at least one axial seal lip extends generally axially and radially outwardly from the first end to the second free end such that the lip is biased radially outwardly by centrifugal force during rotation of the hub to reduce sealing pressure of the lip second end on the inner case radial portion.

12. The wheel hub assembly as recited in claim 1, wherein:
the inner radial end of the outer case radial portion is spaced radially outwardly from the axial portion of the inner case or the outer circumferential surface disposed about the axle by a first radial distance; and
the radial projection is sized such that the inner circumferential surface of the radial projection is spaced from the axial portion of the inner case or the outer circumferential surface disposed about the axle by a second radial distance, the second radial distance being no greater than twenty percent of the first radial distance.

* * * * *